(12) United States Patent  
Gonzales et al.

(10) Patent No.: US 6,748,558 B1
(45) Date of Patent: Jun. 8, 2004

(54) PERFORMANCE MONITOR SYSTEM AND METHOD SUITABLE FOR USE IN AN INTEGRATED CIRCUIT

(75) Inventors: David R. Gonzales, Austin, TX (US); Brian D. Branson, Austin, TX (US); Jimmy Gumulja, Austin, TX (US); William C. Moyer, Dripping Springs, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/567,973

(22) Filed: May 10, 2000

(51) Int. Cl.$^7$ ................................................. G06F 11/00
(52) U.S. Cl. ........................................ 714/47; 702/182
(58) Field of Search ............................. 714/47, 45, 46; 702/182, 186; 711/118–146

(56) References Cited

U.S. PATENT DOCUMENTS

| 4,435,759 | A |   | 3/1984  | Baum et al.                    |
|-----------|---|---|---------|--------------------------------|
| 5,488,688 | A |   | 1/1996  | Gonzales et al. ....... 395/183.1 |
| 5,564,015 | A |   | 10/1996 | Bunnell                        |
| 5,675,729 | A | * | 10/1997 | Mehring ....................... 714/37 |
| 5,727,167 | A |   | 3/1998  | Dwyer, III et al. ......... 395/280 |
| 5,729,726 | A |   | 3/1998  | Levine et al. ............... 395/580 |
| 5,748,855 | A |   | 5/1998  | Levine et al. ........... 395/800.23 |
| 5,802,273 | A |   | 9/1998  | Levine et al. ........... 395/184.01 |
| 5,802,378 | A |   | 9/1998  | Arndt et al. ............... 395/740 |
| 5,805,863 | A |   | 9/1998  | Chang ....................... 395/500 |
| 5,809,523 | A |   | 9/1998  | Kayes et al. ................ 711/118 |
| 5,819,033 | A |   | 10/1998 | Caccavale .............. 395/200.11 |
| 5,845,310 | A | * | 12/1998 | Brooks .......................... 711/3 |
| 5,860,095 | A |   | 1/1999  | Iacobovici et al. ......... 711/119 |
| 5,862,371 | A |   | 1/1999  | Levine et al. ............... 395/569 |
| 5,878,208 | A |   | 3/1999  | Levine et al. ........... 395/183.14 |
| 5,894,575 | A |   | 4/1999  | Levine et al. ............... 395/704 |
| 5,940,855 | A |   | 8/1999  | Kayes et al. ................ 711/118 |
| 5,961,654 | A |   | 10/1999 | Levine et al. ................ 714/47 |
| 5,991,708 | A |   | 11/1999 | Levine et al. ............... 702/186 |
| 6,081,868 | A | * | 6/2000  | Brooks .......................... 711/3 |
| 6,189,072 | B1 | * | 2/2001  | Levine et al. ............... 711/118 |
| 6,233,531 | B1 | * | 5/2001  | Klassen et al. .............. 702/80 |
| 6,256,775 | B1 | * | 7/2001  | Flynn ......................... 717/127 |
| 6,279,123 | B1 | * | 8/2001  | Mulrooney ................... 714/35 |
| 6,463,553 | B1 | * | 10/2002 | Edwards ...................... 714/38 |
| 6,487,683 | B1 | * | 11/2002 | Edwards ...................... 714/38 |

OTHER PUBLICATIONS

"The Nexus 5001 Forum™, a Program of the IEEE–ISTO," http://www.ieee–isto.org/Nexus5001/index.html, ©1999–2000 IEEE Industry Standards & Technology Organization (1 pg.).

Digital Equipment Corporation "Alpha 21066 and Alpha 21066A Microprocessors, Hardware Reference Manual," Jan. 1996, pp. 4–1 through 4–48.

* cited by examiner

Primary Examiner—Robert Beausoliel
Assistant Examiner—Marc M Duncan
(74) Attorney, Agent, or Firm—Mark D. Patrick; Daniel D. Hill

(57) ABSTRACT

A performance monitor system includes a core processor (115), a core processor associated device, such as a cache (123), and first logic, such as performance logic (127). The core processor (115) is operable to execute information. The core processor associated device provides a first signal (CACHE_PERF), which defines performance of the core processor associated device (123) during operation of the core processor (115). The first logic (127) is coupled to the core processor associated device (123) and monitors the first signal (CACHE_PERF) in response to a second signal (WPT0,1), which defines a match of user-settable attributes associated with the operation of the core processor (115).

16 Claims, 4 Drawing Sheets

PERFORMANCE MONITOR SYSTEM AND METHOD SUITABLE FOR USE IN AN INTEGRATED CIRCUIT

FIELD OF THE INVENTION

The present invention relates generally to a performance monitor for integrated circuits, and more particularly to an embedded, on-chip performance monitor system that monitors the operation of a core processor associated device, such as a cache, a memory management unit (MMU) or the like.

RELATED ART

Consumers demand the ability to be able to send and receive information at any time and from any location. There is an increasing need, therefore, for devices that are compact and mobile, such as portable wireless devices including pagers, cellular phones, and personal digital assistants (PDAs). Wireless devices usually include a microcontroller for controlling operations of the device. The device is usually battery powered, such that power management and power consumption are critical issues. Also, it is desired to optimize performance by increasing speed and processing capability as much as practicable, where processing capability is usually measured in millions of instructions per second (MIPS). The microcontroller includes an embedded core processor, also referred to as a central processing unit (CPU) or core, which executes software program instructions, commonly referred to as "code," to operate the device. It is desired to optimize code execution and code density in order to improve power utilization, increase performance, and reduce the amount of memory required for code and data storage within the device.

Certain applications and systems have been developed to debug code and improve code execution and code density. For example, circuitry complying with the On-Chip Emulation (ONCE) standard provides static debug capabilities for embedded core processor type devices such as microcontrollers. The ONCE system includes logic that directly monitors the embedded core processor and enables a developer at an external debug work station to set start and stop points during operation of the core. The developer may then monitor certain data and code after the core processor has been halted in order to perform code debug. Another system is the EEE-ISTO 5001™-1999, The Nexus 5001 Forum™ (NEXUS) standard, which provides a general-purpose interface for the software development and debug of embedded core processors. In accordance with NEXUS, a developer may monitor a core bus of the embedded core processor to view data and code accesses in real-time.

Systems based on the ONCE and NEXUS standards allow a developer to monitor code flow and code behavior to generally improve code operation. Such debug capabilities, however, are not directly applicable to real-time performance monitoring and analysis of the embedded core processor and its associated devices, such as a cache. The ONCE and NEXUS systems do not allow direct and real-time monitoring of cache utilization. Analysis of cache utilization is important when trying to optimize MIPS performance of a core processor. Core processor performance and power consumption are directly affected by cache utilization. Cache utilization is affected by a number of factors, including the type of code being executed, the position of code and data in memory, and the number of times that the code and data are accessed. Cache utilization is based on the number of cache misses or the ratio of cache hits and misses. A cache miss occurs when the core processor attempts to access data or code which is not located in the cache, thus requiring an external memory access. A cache hit occurs when the data or code being accessed by the core processor is located in the cache. Cache misses cause latency and power penalties due to process or pipeline stalls when external memory must be accessed.

Existing techniques for measuring performance of devices associated with the core processor, such as a cache, are unsuitable. Modeling programs, which have been used to simulate cache performance, only provide non real-time statistics. Equipment, such as logic analyzers, may be used to externally interface to the cache to monitor cache hit signals; however, such equipment requires the microcontroller to have special pin-outs to attach the equipment off-chip. In many devices, such as cellular phones, the use of such equipment is not desired because pin count must be minimized to ensure compactness of the device. In addition, connection of on-chip logic to off-chip equipment can alter the behavior of the on-chip logic to the detriment of the evaluation.

It is desired therefore to monitor performance of core associated devices, which are indicative of processor performance, without the use of extra pin-outs or external monitoring equipment.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
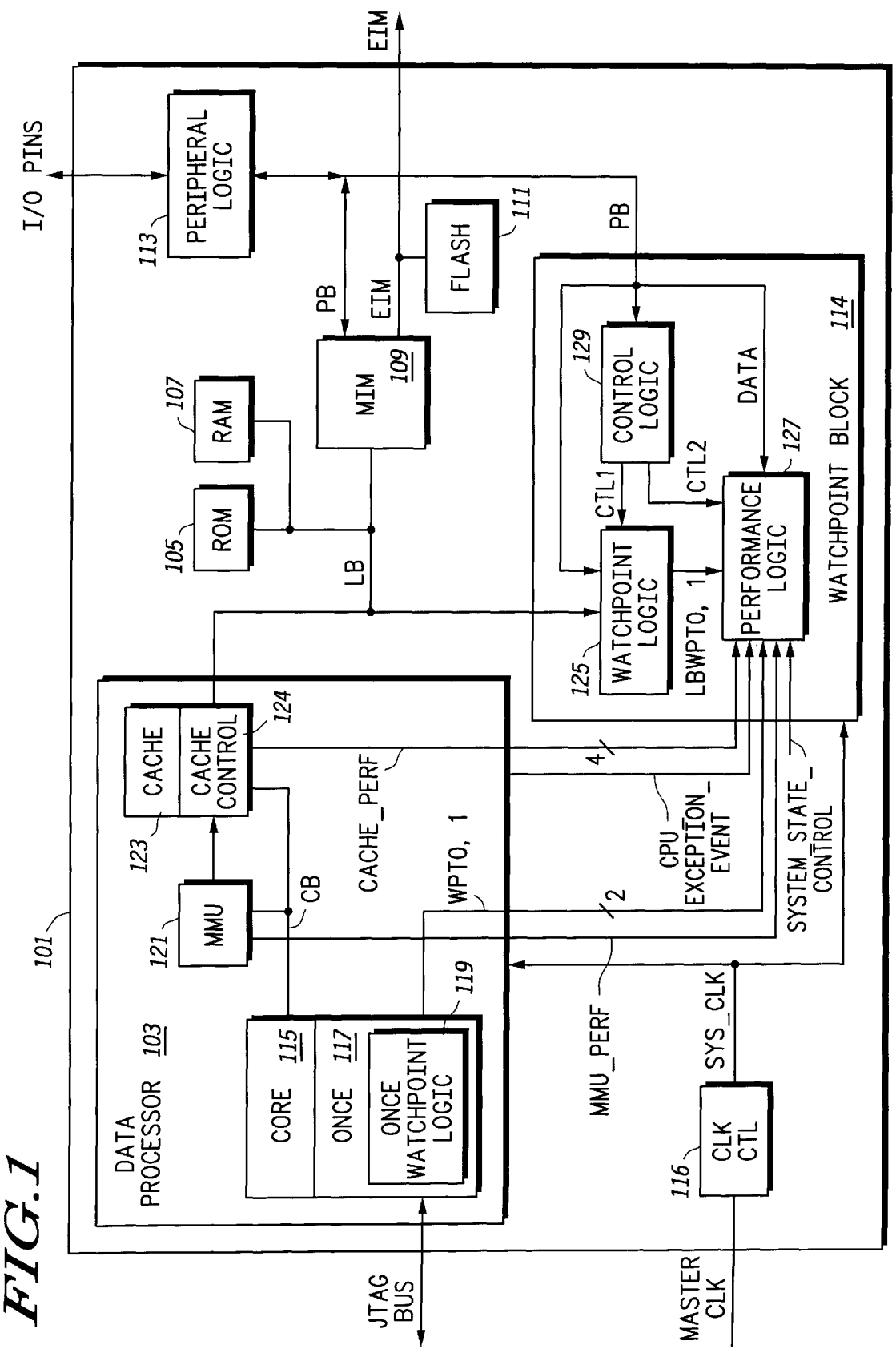
FIG. 1 is a block diagram of an integrated circuit including a performance monitor system implemented according to an embodiment of the present invention.

An embedded, on-chip, real-time performance monitor system described hereinbelow is applicable for use in a processing apparatus, such as a data processor of an embedded microcontroller used in a baseband radio transceiver integrated circuit (IC). The processing apparatus is used to control operations of any type of portable wireless device, such as, for example, pagers, cellular phones, and PDAs. The processing apparatus is operable to execute information, and may include a core processor and a cache or cache system, such as a cache memory and cache controller. The processing apparatus may further include one or more memory devices coupled to the cache for storing information, such as data or code. The core processor accesses information from the cache. If the information is not in the cache, a cache miss occurs and the cache retrieves information from the memory devices.

For example, a data processor is coupled to the external memory devices, where the data processor may include a core processor coupled to an associated device, such as a cache, via a first bus, such as a core bus, and where the cache is coupled to the memory devices via a second bus, such as a local bus. The data processor further includes another device associated with the core processor, such as a memory management unit (MMU), to perform address translations between the first and second buses.

It is desired that the cache contain the information being accessed by the core processor as often as possible, since otherwise a cache miss occurs resulting in degraded performance of the core processor and/or the cache. The cache provides one or more signals defining performance of the cache and indicative of performance of the core processor, such as a first signal indicative of a cache hit or miss. The cache may provide other performance signals characterizing the type of accesses that the core processor performs during a cycle, such as, for example, a data read, a data write, or an instruction fetch. From the performance signals the number of cache hits or misses can be determined for all cycle types.

A user, such as a system or code developer, defines user-settable attributes associated with operation of the core processor. Such user-settable attributes may be incorporated into diagnostic code or the like stored in the external memory devices for utilization by the core processor. The core processor, via the diagnostic code, may program first logic or performance logic that monitors the cache performance signals in response to a second signal defining a match of the user-settable attributes. In one embodiment, the second signal comprises one or more signals that define beginning and ending monitoring events of a monitoring period, during which the performance logic monitors the cache performance signals.

In one embodiment, the performance logic includes one or more counters that count monitoring events during the monitoring period. One counter may count total cycles of the core processor during the monitoring period. Another counter may count the number of cache hits or misses. One or more additional counters count cycle types or modes during the monitoring period, so that the cache hit/miss ratio for any particular cycle type or mode may be determined.

The core processor itself may provide the second signal. In other embodiments, additional second logic or watchpoint logic is included to provide the second signal. The watchpoint logic includes programmable memory or registers or the like to store the userdefined attributes. The watchpoint logic may further include one or more comparators that compare the user-defined attributes with signals associated with operation of the core processor, such as addresses, data or control signals or the like. In one embodiment, watchpoint logic monitors the core bus for particular data values or data ranges, particular addresses or address ranges, particular instructions, particular cycle types or operating modes, etc.; compares such signals with the user defined values; and provides watchpoint signals indicative thereof. For example, the watchpoint logic may be programmed to define a monitoring period to begin upon reading from a particular address or address range and to end upon writing to the same or a different address or address range. In addition or in the alternative, watchpoint logic may be included to monitor the second bus or local bus for similar user-definable attributes or events, and provide similar watchpoint signals to the performance logic. Further, other signals may be used to define or determine performance monitoring events, such as, for example, CPU exception signals and/or system state control signals.

The MMU may also provide one or more signals defining performance of the MMU and indicative of performance of the core processor. For example, MMU performance signals may include a page attribute signal containing information related to access violations, status register bits and/or invalidation operations. The MMU performance signals may further include a memory management miss signal indicating when a virtual address and current address space of an access cycle do not match the virtual address tag and address space identification of one or more entries of a lookup table within the MMU. The performance logic is programmed in the alternative or in addition to monitor the MMU performance signals during a monitoring period.

The processing apparatus may be implemented on an IC or the like, which includes a memory, a cache, a core processor including user-settable attributes and a watchpoint block. A method of monitoring performance of a device associated with the core processor, such as a cache or memory, includes providing a first signal indicative of performance of the associated device, providing a second signal in response to a match of user-settable attributes of the core processor and information executed by the core processor, and monitoring, responsive to the second signal, the first signal.

It is appreciated that the performance monitor system provides many benefits and advantages. A system or code developer programs diagnostic code that controls a data processor of a microcontroller to monitor or track performance signals of core processor associated devices, such as a cache or a MMU, during a user-definable performance monitoring period; and to store or report the results in a desired manner. The results are indicative of core processor performance. Based on the results, the developer may adjust the normal operating code to maximize performance of the monitored devices and, ultimately, the core processor. The monitoring occurs in real-time and is non-intrusive. The developer can track performance at any time and at any location without additional equipment, such as logic analyzers or simulators. Additional pin-outs dedicated to monitoring and reporting are not required. Therefore, the embedded performance monitor system is suitable for use in any type of device, particularly portable wireless devices where compactness is necessary, such as, for example, pagers, cellular phones, and PDAs.

As used herein, the term "bus" is used to refer to a plurality of signals or conductors which may be used to transfer one or more various types of information, such as data, addresses, control, or status. As used herein, a core or core processor is operable to execute information, where information at least includes "data", "addresses" and/or "instructions". The terms "assert" and "negate" are used when referring to the rendering of a signal, status bit, or similar apparatus into its logically true or logically false state, respectively. If the logically true state is a logic level one, the logically false state is a logic level zero and vice versa.

FIG. 1 is a block diagram of an IC 101 incorporating a performance monitor system. The IC 101 may be a chip that forms the main processing functions of a larger system such as, for example, a pager, a cellular phone, or a PDA. The IC 101 may be, for example, a baseband radio transceiver IC for a cellular phone or an embedded microcontroller for a PDA. In the embodiment shown, the IC 101 performs the primary processing functions for the portable wireless device and in which it is desired to maximize the number of MIPS of performance of such transceiver or microcontroller. The IC 101 may substantially comprise only those components shown or may further include additional memory devices, input/output (I/O) devices, one or more interprocessor communication modules (IPCMs), digital signal processors (DSPs), etc. It is noted that the performance monitor system is not limited to use in portable wireless devices and is applicable to any device or system in which it is desired to monitor processor performance in real-time without the necessity of external equipment and with little or no additional I/O pins.

The IC 101 includes a data processor 103 coupled to one or more memory devices via a physical or local bus LB, where the memory devices include read-only memory (ROM) 105, random access memory (RAM) 107 and a memory interface module (MIM) 109. The local bus LB may be provided externally from the IC 101. The MIM 109 is coupled to flash memory 111 via an external interface module (EIM) bus, where the EIM bus is provided externally from the IC 101. The flash memory 111 is provided for storing user-defined data such as names and phone numbers, etc. The MIM 109 separates the local bus LB from the EIM bus and the flash memory 111, where the EIM bus and the flash memory 111 operate at a slower rate as compared to the local bus LB.

The MIM 109 is coupled to peripheral logic 113 and a watchpoint block 114 via a peripheral bus PB. The peripheral logic 113 provides I/O pins external to the IC 101. The watchpoint block 114 is coupled to monitor the local bus LB. A clock control circuit (CLK CTL) 116 receives an external master system clock signal, referred to as MASTER CLK, and provides local clock signal SYS_CLK. SYS_CLK is provided to the various components on the IC 101 including the data processor 103 and the watchpoint block 114.

The data processor 103 further includes a CPU or core processor or simply "core" 115, which includes ONCE debug logic 117. The ONCE debug logic 117 communicates outside of the IC 101 via an IEEE Standard 1149.1 joint test action group (JTAG) bus, which in the embodiment shown is a serial debug interface bus. The ONCE debug logic 117 also includes ONCE watchpoint logic 119, which provides two signals WPT0 and WPT1 (WPT0,1) to the watchpoint block 114. The core 115 communicates with an MMU 121 and a cache memory 123 within the data processor 103 via a core bus CB. The cache memory 123 is coupled to a cache controller 124 within the data processor 103, where the cache controller 124 is further coupled to both the MMU 121 and the core 115 via the core bus CB. The MMU 121 performs address translation between the core bus CB and the local bus LB, which further supports multiple processes simultaneously by translating between virtual memory addresses associated with the core bus CB versus the physical memory space associated with the local bus LB. The core bus CB is not provided or accessible outside of the data processor 103 in the embodiment shown. The core 115 may be a reduced instruction set computer (RISC) device, in which case the core bus CB comprises a RISC communication engine (RCE) bus. It is understood, however, that the core 115 and/or the core bus CB are not limited to any particular implementation.

The MMU 121 provides one or more performance signals MMU_PERF to the watchpoint block 114. As described further below, in the embodiment shown, MMU_PERF includes one or more signals indicating performance parameters of the MMU 121, such as a page attribute signal MMU_PAGE_ATTRIBUTE containing information related to access violations, MMU status register bits, MMU physical page status bits, and/or MMU invalidation operations; and an MMU miss signal MMU_MISS indicating when a virtual address and current address space of an access cycle do not match the virtual address tag and address space identification (ASID) of one or more entries of a lookup table, which is referred to as the table lookaside buffer (TLB), within the MMU 121. The MMU 121 incorporates the TLB and comparative logic and determines the number of exceptions incurred by the core 115. An exception is similar to an interrupt in that it slows down operation of the core 115 and may significantly affect performance of the core 115. In the embodiment shown, MMU_PERF may be programmed to be provided upon any type of exception detected by the MMU 121, or may be programmed to be provided based on the status of one or more TLB entries. The cache controller 124 provides one or more cache performance signals CACHE_PERF to the watchpoint block 114. CACHE_PERF is indicative of the performance of the core 115 while accessing the cache memory 123. As described further below, in the embodiment shown, CACHE_PERF identifies instruction access cycles, data versus address access cycles, whether a cycle is read or write, and cache hits or misses.

The data processor 103 provides a signal CPU_EXCEPTION_EVENT to the watchpoint block 114. The watchpoint block 114 further receives one or more signals SYSTEM_STATE_CONTROL that provide information such as bus arbitration from one or more bus masters, direct memory access (DMA) controllers or external sources. SYSTEM_STATE_CONTROL may, for example, also contain external triggers from other sections of the device incorporating the IC 101.

It is desired to monitor the performance of the IC 101 and, more particularly, the data processor 103. In order to monitor the performance of the data processor 103, it is further desired to monitor operation of the MMU 121 and the cache memory 123. In general, a software program or code is executed by the data processor 103 from the memory devices, including the ROM 105 and the RAM 107, via the local bus LB. The core 115 provides addresses and/or data on the core bus CB to retrieve or store instructions or data. If the instruction or data or address location is not found within the cache 123, then a cache miss occurs and the cache controller 124 accesses the information from the memory devices across the local bus LB. If the instruction, data or addressed location is found within the cache memory 123, then a cache hit has occurred thereby avoiding data and/or instruction retrieval from the memory devices via the local bus LB. It is desired to reduce the number of accesses to the external memory devices, since such external accesses substantially reduce the efficiency of operation of the data processor 103. In particular, such external accesses to the local bus LB consume a significant amount of power and take a substantial amount of time as compare to accesses directly from the cache memory 123.

In order to monitor the performance of the data processor 103, it is desired to monitor operation of the MMU 121 and utilization of the cache memory 123 during certain operations of the core 115 without halting such operations. Beginning and ending monitoring events are determined, such as, for example, when the core 115 reads from or writes to a predetermined address or address range, or when the core 115 reads or writes a data value or within a range of data values, or when the core 115 retrieves and/or executes a particular data instruction. Such monitoring events may be determined by monitoring the core bus CB, except that the core bus CB is not provided or accessible outside of the data processor 103. The sensitivity of the core bus CB to electrical loading makes it undesirable to route the core bus CB outside of the data processor 103. Loading on the core bus CB affects the timing and electrical characteristics of the core bus CB, and consumes significant power and potentially slows down operation of the core bus CB. The addition of buffers to reduce loading on the core bus CB could cause an undesirable increase in power consumption, and could affect critical timing parameters. Use of extra pin-outs for attaching monitoring equipment, such as logic. analyzers, to gather performance statistics, such as those associated with the MMU 121 or the cache memory 123, are also undesirable because in many devices, including portable cellular phones, pin count must be minimized to ensure compactness of the device. Nevertheless, a developer may desire to evaluate the performance of the cache memory 123 and/or the MMU 121 in real-time. For example, it may be desired that specific code and/or data be located or otherwise locked within the cache memory 123 at specific times to maximize the hit/miss ratio and thereby improve performance of the data processor 103.

The ONCE watchpoint logic 119 is provided to determine and indicate, in real-time, the occurrence of monitoring events associated with the core 115 without the necessity of halting the operation of the core 115. The ONCE debug logic 117 was previously used as a static debug system programmed via the JTAG bus to start and stop operation of the core 115; however, the ONCE watchpoint logic 119 adds the capability of indicating beginning and ending monitoring events via the WPT0,I signals without halting operation of the core 115. In addition, the ONCE watchpoint logic 119 includes registers that are memory mapped into the accessible memory of the core 115, so that the ONCE watchpoint logic 119 is programmable by the core 115 to set any one or more beginning and ending monitoring events. In this manner, in one embodiment, the code executed by the core 115 during normal operation may further include diagnostic code used to program the ONCE watchpoint logic 119. Alternatively, separate diagnostic code may be loaded by a developer or service technician into the memory devices (such as the RAM 107) and executed by the core 115 for purposes of monitoring operation and performance at any location and at any time. WPT0,1 may be programmed independently or in combination for indicating any monitoring events of interest associated with the core bus CB.

Figure 4:
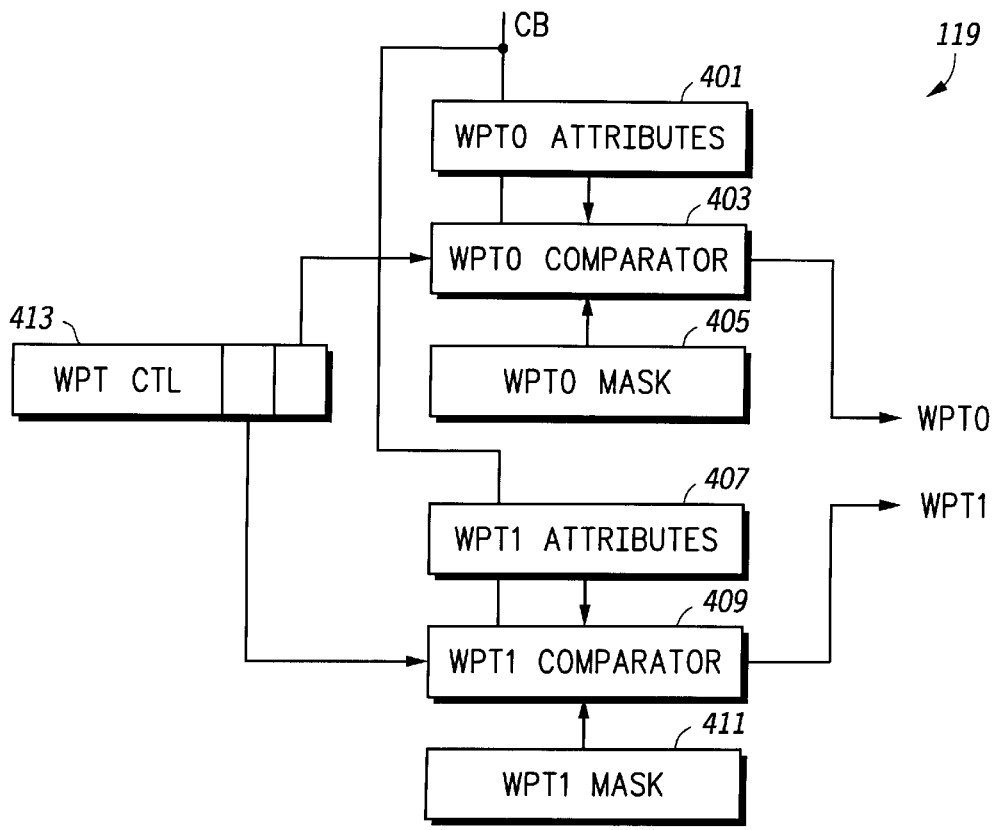
FIG. 4 is a block diagram illustrating an exemplary embodiment of the ONCE watchpoint logic of the performance monitor system of FIG. 1.

FIG. 4 is a block diagram of an exemplary embodiment of the ONCE watchpoint logic 119 within the ONCE debug logic 117. The ONCE watchpoint logic 119 programs and provides WPT0,1. The core bus CB is provided to WPT0 attributes logic 401 and a WPT0 comparator 403. The WPT0 comparator 403 provides the signal WPT0. A WPT0 mask register 405 is coupled to the WPT0 comparator 403 for identifying a data or address value or a range of data or address values for purposes of comparison by the WPT0 comparator 403. A WPT control (WPT CTL) register 413 is coupled to enable or disable the WPT0 comparator 403. The WPT0 attributes logic 401, the WPT0 comparator 403, the WPT0 mask register 405 and the WPT CTL register 413 are programmed by the core 115, such as when executing diagnostic code.

In operation, control signals of the core bus CB are monitored by the WPT0 attributes logic 401 to identify the mode or type of signal to be monitored. Signal types include data, address or instructions. The mode identifies the particular operating mode, such as privileged or non-privileged operation and whether a core cycle is read or write, an instruction fetch or an instruction execution, etc. The WPT0 comparator 403 receives the address and data signals on the core bus CB and compares particular data or address values or associated data or address ranges programmed into the WPT0 mask register 405. In combination, the WPT CTL register 413, the WPT0 attributes logic 401, the WPT0 comparator 403 and the WPT0 mask register 405 are programmed and used to identify a monitoring event via the signal WPT0. The WPT0 comparator 403 operates to provide the signal WPT0 upon the occurrence of a programmed monitoring event when enabled by the WPT CTL register 413. Thus, if the developer desires to determine whether a particular address range is being read, the developer enables a monitoring event by programming the appropriate bit within the WPT CTL register 413, programs the WPT0 mask register 405 to identify the range of addresses for comparison, and further programs the WPT0 attributes logic 401 to distinguish a read address cycle. In operation, when the WPT0 attributes logic 401 detects an address read cycle to any addresses within the address range identified by the WPT0 mask register 405, then the signal WPT0 is provided by the WPT0 comparator 403 to identify a monitoring event.

In a similar manner, the control signals of the core bus CB are provided to a WPT1 attributes logic 407. The address and data signals on the core bus CB are provided to a WPT1 comparator 409, which is further coupled to the WPT1 attributes logic 407. A WPT1 mask register 411 is coupled to the WPT1 comparator 409. The WPT CTL register 413 is coupled to enable the WPT1 comparator 409 via an associate bit, where the WPT1 comparator 409 provides the WPT1 signal if a programmed monitoring event is detected. The WPT1 attributes logic 407, the WPT1 comparator 409 and the WPT1 mask register 411 operate in a manner similar to that of the WPT0 attributes logic 401, the WPT0 comparator 403 and the WPT0 mask register 405, respectively, described above.

The ONCE watchpoint logic 119 of FIG. 1 is programmed to identify any desired beginning and ending monitoring events and to indicate the occurrence of such events via WPT0,1. WPT0,1 may be used independently or in combination. As described further below, the watchpoint block 114 monitors performance of the MMU 121 via MMU_PERF and monitors performance of the cache memory 123 via CACHE_PERF. CACHE_PERF and MMU_PERF are monitored by logic within the watchpoint block 114 when indicated by beginning and ending events, such as triggered by WPT0,1. Any of the rising or falling edges (transitions) or the logic levels of WPT0,1 may be utilized to trigger a monitoring event.

The watchpoint block 114 is provided to enable a real-time, resident performance monitor that is capable of evaluating specific areas of code and/or data without the need of any external equipment. In one embodiment, the watchpoint block 114 is memory mapped to be accessible via the peripheral bus PB by code executed by the core 115 as previously described, so that the watchpoint block 114 may be armed and disarmed at any time. The watchpoint block 114 further has the ability to discriminate how to start and stop counting certain performance attributes of the cache memory 123 or the MMU 121, such as the number of cache misses or TLB misses, respectively.

The watchpoint block 114 includes performance logic 127 that receives the signals CACHE_PERF, MMU_PERF, WPT0,1, CPU_EXCEPTION_EVENT and SYSTEM_STATE_CONTROL. The watchpoint block 114 further includes watchpoint logic 125 that is coupled to monitor the local bus LB. The watchpoint logic 125 provides signals LBWPT0 and LBWPT1 (LBWPT0,1) to the performance logic 127, where LBWPT0,1 operate in a similar manner as WPT0,1. For example, in one embodiment, the watchpoint logic 125 includes logic similar to that employed by the ONCE watchpoint logic 119 shown in FIG. 4. The watchpoint logic 125, via LBWPT0,1, identifies and indicates monitoring events on the local bus LB, while the ONCE watchpoint logic 119 tracks cycles on the core bus CB.

In general, the performance logic 127 is programmed to define monitoring events (beginning or ending) based on signal transitions or states of any of the signals WPT0,1, LBWPT0,1, CPU_EXCEPTION_EVENT or SYSTEM_STATE_CONTROL, or any combination thereof. These signals define a match of user-settable attributes associated with operation of the core 115.

The watchpoint block 114 further includes control logic 129 coupled to the peripheral bus PB. The control logic 129 provides one or more control signals CTL1 to the watchpoint logic 125 and one or more control signals CTL2 to the performance logic 127. The watchpoint logic 125 and the performance logic 127 are each coupled to the peripheral bus PB, for purposes of programming. In one embodiment, the watchpoint logic 125 and the performance logic 127 each include memory or programmable registers that are memory mapped into the memory space of the core 115, so that the registers are programmable by diagnostic code executed by the core 115 from the memory devices. The watchpoint logic 125 can be programmed to determine and indicate monitoring events occurring on the local bus LB.

The performance logic 127 monitors performance of the cache memory 123 via CACHE_PERF provided by the cache controller 124. The performance logic 127 monitors performance of the MMU 121 via MMU_PERF provided by the MMU 121. Such monitoring occurs based on transitions or states of the signals WPT0,1, LBWPT0,1, CPU_EXCEPTION_EVENT, SYSTEM_STATE_CONTROL, or any combination of these signals, which are fully programmable by a developer.

Figure 2:
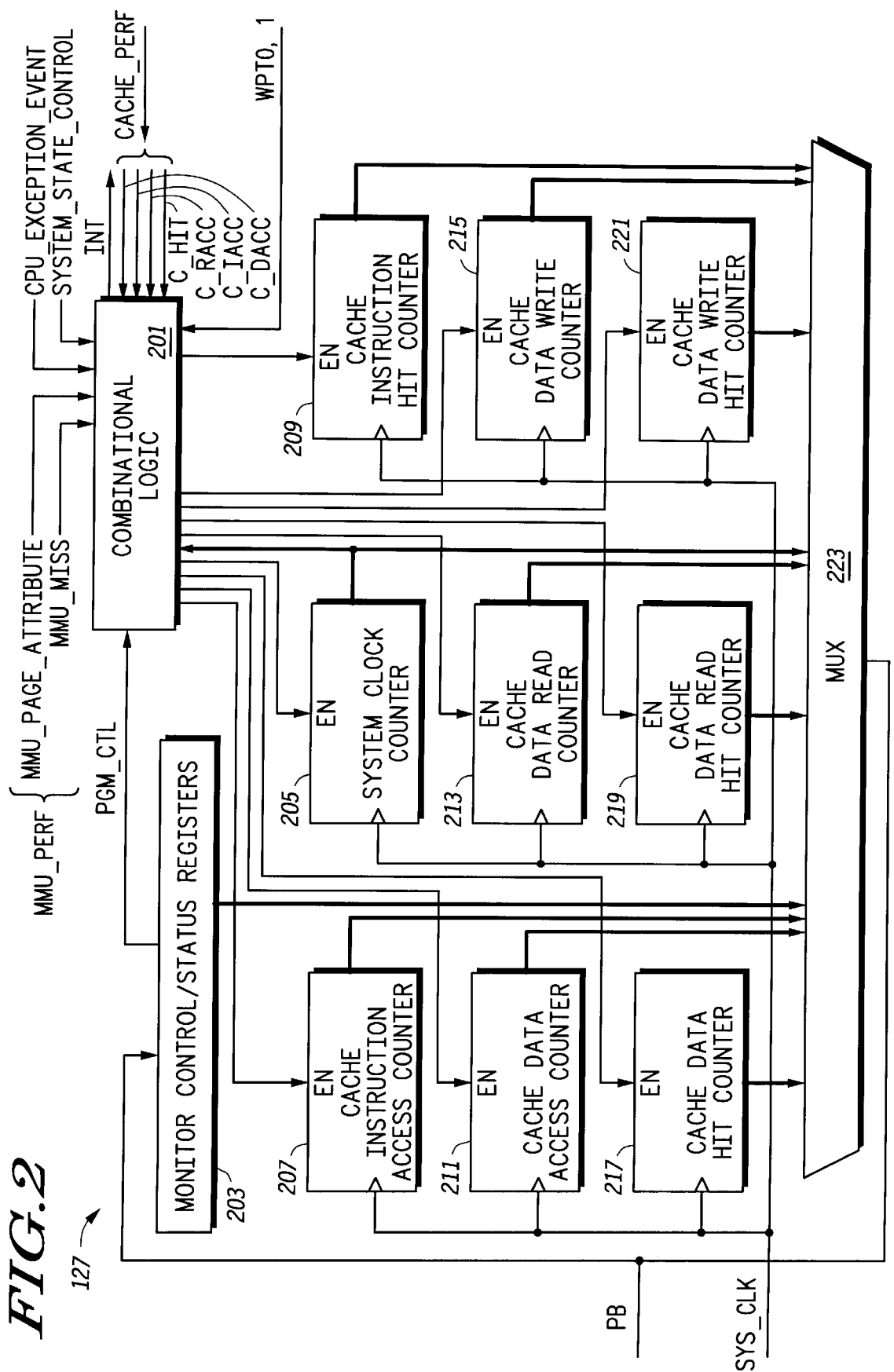
FIG. 2 is a block diagram of an exemplary embodiment of the performance logic of the performance monitor system of FIG. 1.

FIG. 2 is a block diagram of an exemplary embodiment of the performance logic 127 of the watchpoint block 114. The performance logic 127 includes combinational logic 201, one or more monitor control and status register(s) 203, a plurality of counters 205, 207, 209, 211, 213, 215, 217, 219 and 221 (collectively, 205–221), and a multiplexer (MUX) 223. The combinational logic 201 receives the signals WPT0,1 from the ONCE watchpoint logic 119, LBWPT0,1 from the watchpoint logic 125,MMU_PERF from the MMU 121,CACHE_PERF from the cache controller 124, CPU_EXCEPTION_EVENT from the data processor 103 and SYSTEM_STATE_CONTROL. CACHE_PERF includes a cache data access signal C_DACC, a cache instruction access signal C_IACC, a cache read/write signal C_RACC, and a cache hit signal C_HIT. The monitor control and status register(s) 203 are coupled to the peripheral bus PB to enable programming by an external device, such as the core 115. Again, the monitor control and status register(s) 203 are optionally memory mapped into the memory space of the core 115 for access and programming by diagnostic code. The monitor control and status register (s) 203 provide corresponding program control signals PGM_CTL to the combinational logic 201 for programming operation of the performance logic 127.

The combinational logic 201 provides a respective event signal to an enable input of each of the counters 205–221. SYS_CLK is provided to the clock input of each of the counters 205–221. In this manner, each counter 205–221 counts the number of cycles of SYS_CLK when enabled by the combinational logic 201 via a corresponding event signal. The output of the monitor control and status register (s) 203 and of each of the counters 205–221 is provided to respective inputs of the MUX 223. The output of the MUX 223 is coupled to the peripheral bus PB to enable access to the status and programmed control parameters and to retrieve the data from each of the counters 205–221. The combinational logic 201 may optionally be programmed via the monitor control and status register(s) 203 to provide an interrupt signal INT based on any programmed conditions.

The counters 205–221 include a system clock counter 205 and a plurality of counters 207–221 which, in the embodiment shown, are specific to performance of the cache memory 123. In one embodiment, additional counters are included (not shown) for purposes of monitoring the performance of the MMU 121 via MMU_PERF, where the MMU counters operate in a manner similar to that of the cache counters. In an alternative embodiment and depending upon the programming of the combinational logic 201, one or more of the counters 207–221 are used for the MMU 121 and MMU_PERF rather than for the cache memory 123 and CACHE_PERF. The combinational logic 201 may include multiplexer logic to program selection between MMU_PERF or CACHE_PERF.

The system clock counter 205 counts each assertion of SYS_CLK when enabled. The system clock counter 205 is usually enabled for an entire monitoring period between a beginning monitoring event and an ending monitoring event so as to track total system clock cycles. A cache instruction access counter 207 is enabled to be incremented by SYS_CLK for every instruction access that is made to the cache memory 123 during the monitoring period. A cache instruction hit counter 209 is enabled to be incremented by SYS_CLK for every instruction access that causes a cache hit during the monitoring period. A cache data access counter 2 11 is enabled to be incremented by SYS_CLK for every data access cycle in the cache memory 123 during the monitoring period. A cache data read counter 213 is enabled to be incremented by SYS_CLK for every data read access of the cache memory 123 during the monitoring period. A cache data write counter 215 is enabled to be incremented by SYS_CLK for every data write cycle to the cache memory 123 during the monitoring period. A cache data hit counter 217 is enabled to be incremented by SYS_CLK for every cache hit during a data access cycle in the cache memory 123 during the monitoring period. A cache data read hit counter 219 is enabled to be incremented by SYS_CLK for every cache hit during a data read cycle for the cache memory 123 during the monitoring period. A cache data write hit counter 221 is enabled to be incremented by SYS_CLK for every cache hit that occurs during a data write cycle to the cache memory 123 during the monitoring period.

The total count values of each of the counters 205–221 may be read from the peripheral bus PB via the MUX 223. The count values provide an indication of cache performance during the applicable monitoring period. The system clock counter 205 provides the total system clock cycles during the monitoring period. The total number of cache hits is provided by the combined cache instruction hit and cache data hit counters 209 and 217. The total number of cache data hits is provided by the combined cache data read hit and cache data write hit counters 219 and 221. The difference between the total clock cycles and the total number of cache hits provides the total number of cache misses during the monitoring period. The total cache hit/miss ratio may then be easily calculated. In a similar manner, other cache performance indicators may be determined for the monitoring period. For example, the number of data cache hits and misses per total data accesses may be determined from the counters 211 and 217. Similarly, the total number of data write hits and misses per a total number of data write cycles may be determined using the count values in the counters 215 and 221. Similar values associated with data read cycles and instruction cycles may also be determined.

Figure 3:
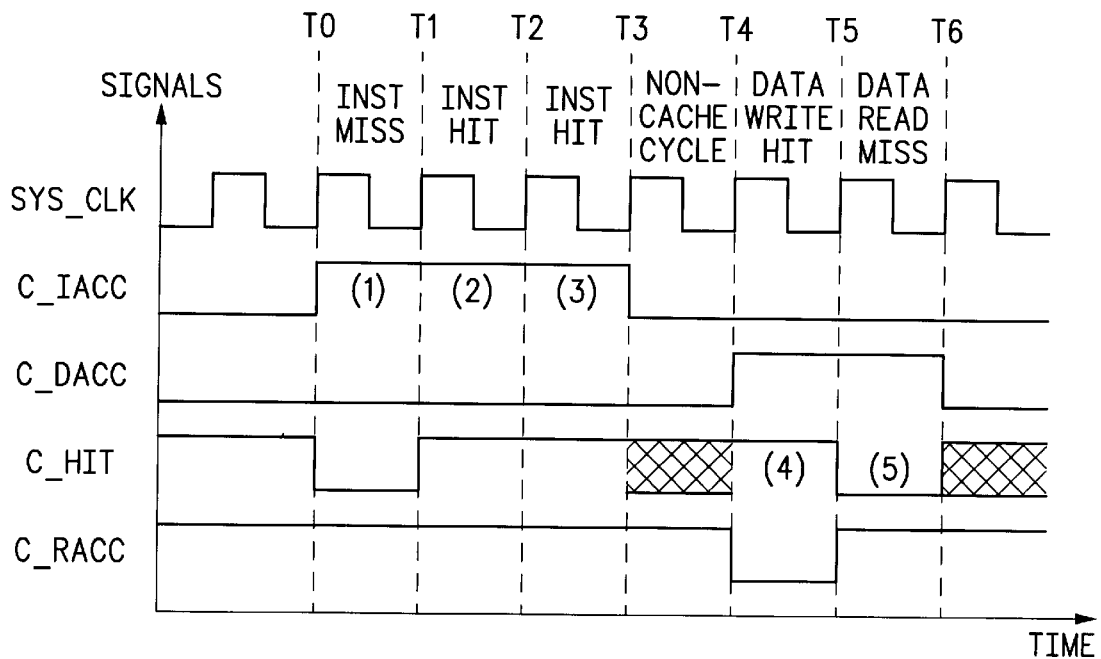
FIG. 3 is a timing diagram illustrating performance signals provided by a cache controller and corresponding operation of the performance logic of FIG. 2.

FIG. 3 is a timing diagram generally illustrating operation of the performance logic 127 while monitoring cache performance. In this illustration, the combinational logic 201 and monitor control and status register(s) 203 are programmed to monitor cache performance via CACHE_PERF during a monitoring period. SYS_CLK and the signals C_IACC, C_DACC, C_HIT, and C_RACC are all plotted versus time. Each access cycle is defined by the rising edge of SYS_CLK. C_IACC and C_DACC are initially negated while C_HIT and C_RACC are asserted.

During a first cycle of SYS_CLK between times T0 and T1, C_IACC is asserted and C_HIT is negated. This first cycle T0–T1 is an instruction miss (INST MISS) cycle since C_IACC is asserted thereby indicating an instruction access while C_HIT is negated thereby indicating a cache miss. The cache instruction access counter 207 is incremented whereas the cache instruction hit counter 209 is not since the first cycle is a cache miss cycle.

During a next cycle between times T1 and T2, C_IACC remains asserted thereby indicating another instruction access while C_HIT is asserted thereby indicating an instruction hit (INST HIT) cycle. Thus, the cache instruction access counter 207 and the cache instruction hit counter 209 are incremented.

In the next cycle between times T2 and T3, C_IACC and C_HIT remain asserted thereby indicating another 1NST HIT cycle. The cache instruction access counter 207 and the cache instruction hit counter 209 are incremented.

During the next cycle between times T3 and T4, C_IACC and C_DACC are both negated indicating a non-cache cycle.

In the next cycle between times T4 and T5, C_IACC remains negated, C_DACC is asserted, C_HIT remains asserted and C_RACC is negated thereby indicating a data write hit (DATA WRITE HIT) cycle. The cache data access counter 211, the cache data write counter 215, the cache data hit counter 217, and the cache data write hit counter 221 are incremented indicating a data write hit.

In the next cycle between times T5 and T6, C_DACC remains asserted, C_HIT is negated, and C_RACC is asserted thereby indicating a date read miss (DATA READ MISS) cycle. The cache data access counter 211 and the cache data read counter 213 are incremented, whereas the cache data hit counter 217, the cache data read hit counter 219 are not incremented thereby indicating a cache miss cycle.

FIG. 3 illustrates monitoring cache performance using CACHE_PERF to count monitoring events during a monitoring period. MMU_PERF is used in a similar manner to count monitoring events during a monitoring period to track performance of the MMU 121, where additional MMU counters are provided or one or more of the counters 207–221 are utilized to monitor MMU events.

Figure 5:
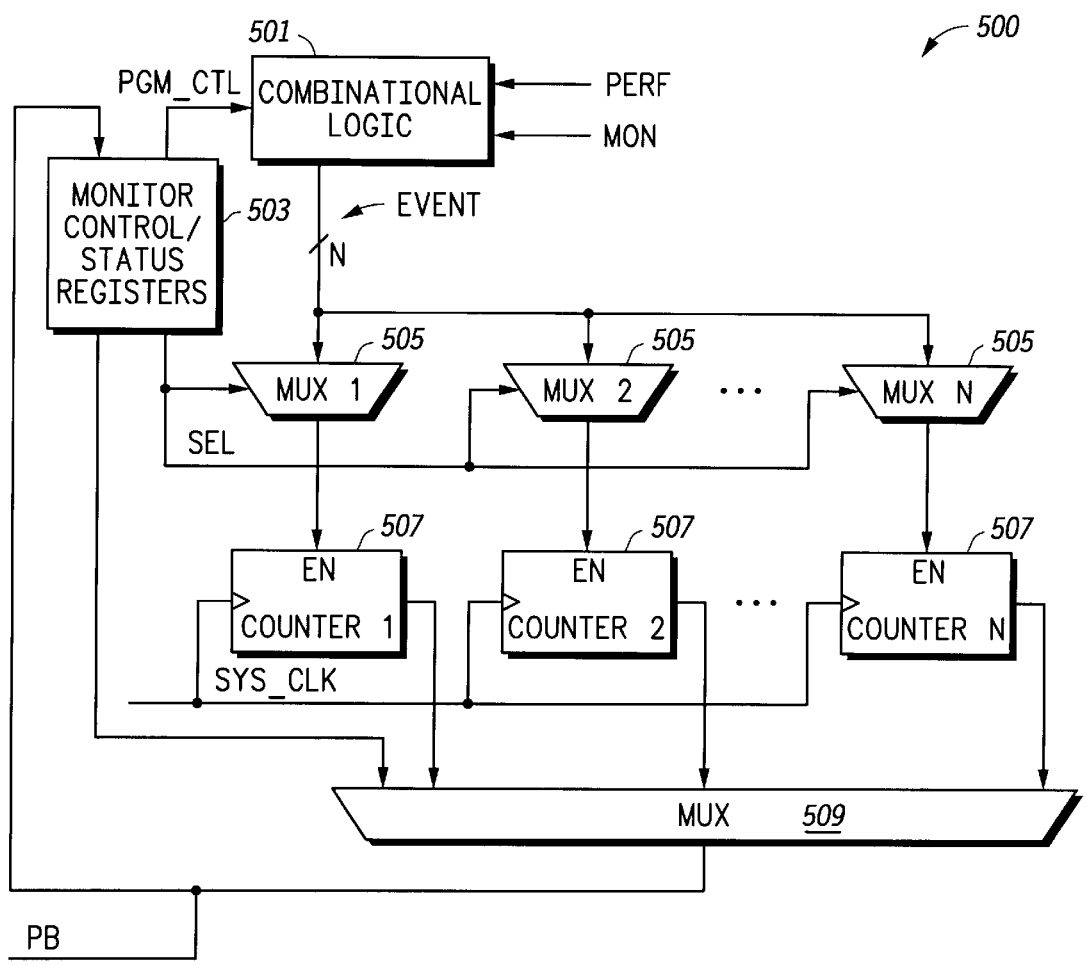
FIG. 5 is a block diagram of an exemplary and alternative embodiment of the performance logic shown in FIG. 2.

FIG. 5 is it block diagram of performance logic 500 illustrating an exemplary and alternative embodiment of the performance logic 127 shown in FIG. 2. The performance logic 500 operates in at manner similar to that of the performance logic 127 but enables more generalized operation. The performance logic 500 includes combinational logic 501, one or more monitor control and status register(s) 503, a plurality of counters 507 individually labeled COUNTER 1, COUNTER 2, . . . , COUNTER N, where N is a positive integer greater than zero, and a MUX 509. The performance logic 500 further includes "N" MUXs 505, individually labeled MUX 1, MUX 2, . . . , MUX N, where N is a positive integer greater than zero. The combinational logic 501 receives a plurality of performance signals PERF indicating events to be monitored, which may include any of the performance signals previously described, including MMU_PERF, CACHE_PERF, CPU_EXCEPTION_EVENT and SYSTEM_STATE_CONTROL. The combinational logic 501 also receives a plurality of monitor signals MON that are used to define one or more monitoring periods, which may include any of the control signals previously described, including WPT0,1 and LBWPT0,1.

The monitor control and status register(s) 503 is programmed via the peripheral bus PB and provides PGM_CTL to program operation of the combinational logic 501. Based on monitoring and event information from PGM_CTL, the combinational logic 501 asserts one or more of up to "N" EVENT signals, where the EVENT signals are provided to respective inputs of each of the MUXs 505. The monitor control and status register(s) 503 assert a plurality of select signals SEL to select inputs of the MUXs 505, where each MUX 505 asserts a selected one of the N EVENT signals at its respective output. The selected EVENT signal of each MUX is provided to the enable input of a respective one of the counters 507. Outputs of the counters 507 and the monitor control and status register(s) 503 are provided to respective inputs of the MUX 509, which provides its outputs to the peripheral bus PB.

Operation of the performance logic 500 is similar to that of the performance logic 127, except that the performance logic 500 allows the counters 507 to be generic and defined in any manner by the diagnostic code. For example, the monitor control and status register(s) 503 and the combinational logic 501 may be programmed to use one or more of the counters 507 to count cache events for one monitoring period and then MMU events for another period. Further, the counters 507 may be programmed to count cache and MMU events simultaneously if desired.

It will be recognized that the embedded performance monitor system described herein has advantages. One advantage is that the embedded performance monitor system does not require external equipment, such as logic analyzers, to be attached during real-time performance monitoring. At the conclusion of a monitoring period, the counts of counters 205–221 of the performance logic 127 of FIG. 2 or the counts of counters 507 of the performance logic 500 of FIG. 5 may be stored in memory, such as the flash memory 111, via the MUX 223 or the MUX 509, respectively, and the peripheral bus PB. A developer at a workstation can later retrieve the stored real-time performance data via the peripheral bus PB and the I/O pins of FIG. 1. This flexibility is particularly beneficial to developers of portable wireless products, the operating performance of which can vary significantly based on the physical location of the product. Because the performance monitor system is embedded in the IC 101 used in the product, a developer need only operate the product in the desired physical location to gather the real-time performance data. Real-time performance data gathered during operation of the product in areas where the product suffers degraded performance (e.g., indoors) may be used by the developer to optimize code placement in the product and, in turn, improve performance of the product in such degraded areas. For example, the stored real-time performance data may show that locking critical programs such as interrupt service routines, radio operating system task schedulers, and radio operating system task dispatchers in the cache 123 rather that in the flash memory 111 improves performance of the product in such degraded areas.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A performance monitor system comprising:
    a core processor operable to execute information, the core processor having a first input to receive user-settable attributes from an external device, and the core processor having at least one comparator for providing a second signal;
    a first bus;
    core processor associated device coupled to the core processor via the first bus, the core processor associated device to provide a first signal, the first signal defining performance of the core processor associated device during operation of the core processor; and
    first logic coupled to the core processor associated device, the first logic to monitor the first signal in response to a second signal defining a match of user-settable attributes associated with the operation of the core processor;
    wherein the core processor, the core processor associated device and the first bus are contained in a data processor.

2. A performance monitor system according to claim 1 further comprising a memory coupled to the data processor, the memory containing the user-settable attributes.

3. A performance monitor system according to claim 2 further comprising second logic coupled to the first logic, the second logic to provide the second signal.

4. A performance monitor system according to claim 3
    further comprising a second bus coupled to the data processor and the memory, the second bus accessible outside of the data processor; and
    wherein the second logic monitors the second bus.

5. A performance monitor system according to claim 1 wherein the user-settable attributes comprise at least one address, the at least one address associated with the information executed by the core processor.

6. A performance monitor system according to claim 1 wherein
    the core processor associated device is a cache, and
    the first signal is a cache performance signal.

7. A performance monitor system according to claim 6 wherein the first logic comprises at least one counter lo count one of a cache hit and a cache miss.

8. A performance monitor system according to claim 1 wherein
    the core processor associated device is a memory management unit (MU), and
    the first signal is a MMU performance signal.

9. An integrated circuit (IC) comprising:
    a memory;
    a cache coupled to the memory, the cache to provide a first signal indicative of performance of the cache;
    a core processor coupled to the cache, the core processor to execute contents of one of the memory and the cache, the core processor comprising user-setle attributes, the core processor to provide a second signal in response to a match of the user-settable attributes and the executed contents of the one of the memory and the cache;
    a watchpoint block coupled to the cache and the core processor, the watchpoint block comprising at least one counter, the watchpoint block, in response to the second signal, to monitor the first signal by operating the at least one counter; and
    a memory management unit coupled to the watchpoint block, the memory management unit to provide a third signal, the third signal defining performance of the memory management unit.

10. An IC according to claim 9 wherein the at least one counter comprises a system clock counter, a cache instruction access counter, a cache data access counter, a cache data hit counter, a cache data read counter, a cache data read hit counter, a cache instruction hit counter, a cache data write counter and a cache data write hit counter.

11. An IC according to claim 9 wherein the watchpoint block comprises control logic, watchpoint logic and performance logic, the performance logic to receive the first and second signals, the performance block comprising the at least one counter.

12. A method of monitoring performance of a cache associated with a core processor, the method comprising:
    providing a first signal indicative of performance of the cache;
    providing a second signal in response to a match of user-settable attributes of the core processor and information executed by the core processor; and
    monitoring, responsive to the second signal, the first signal;
    counting one of a cache hit and a cache miss: and storing the one of the cache hit and the cache miss in a memory.

13. A method according to claim 12 further comprising manually inputting the use-settable attributes into the core processor.

14. A method according to claim 12 further comprising reading the user-settable attributes from a memory.

15. A method according to claim 12 wherein
    providing further comprises providing the first signal indicative of performance of a memory management unit comprising a look up table; and
    monitoring further comprises counting a lookup table miss.

16. A method according to claim 15 further comprising, after counting, storing the lookup table miss in a memory.

* * * * *

UNITED STATES PATENT AND TRADEMARK OFFICE
CERTIFICATE OF CORRECTION

PATENT NO. : 6,748,558 B1
DATED : June 8, 2004
INVENTOR(S) : David R. Gonzales et al.

It is certified that error appears in the above-identified patent and that said Letters Patent is hereby corrected as shown below:

<u>Column 13,</u>
Line 35, add -- a -- at beginning of line before "core".

<u>Column 14,</u>
Line 2, change 'lo" to -- to --.
Line 7, change "(MU)," to -- (MMU), --.
Line 16, change "user-setle" to -- user-settable --.
Line 54, change "use-settable" to -- user-settable --.
Line 61, change "look up" to -- lookup --.

Signed and Sealed this

Eleventh Day of April, 2006

JON W. DUDAS
*Director of the United States Patent and Trademark Office*